US008995327B2

(12) United States Patent
Guo

(10) Patent No.: US 8,995,327 B2
(45) Date of Patent: Mar. 31, 2015

(54) BROADCASTING MESSAGES IN MULTI-CHANNEL VEHICULAR NETWORKS

(75) Inventor: Jianlin Guo, Malden, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 941 days.

(21) Appl. No.: 12/629,414

(22) Filed: Dec. 2, 2009

(65) Prior Publication Data

US 2011/0128902 A1 Jun. 2, 2011

(51) Int. Cl.
*H04H 20/71* (2008.01)
*H04B 7/204* (2006.01)
*H04H 60/80* (2008.01)
*G08G 1/16* (2006.01)

(52) U.S. Cl.
CPC ............... *H04H 60/80* (2013.01); *G08G 1/161* (2013.01)
USPC ............ 370/312; 370/319; 370/390; 370/432

(58) Field of Classification Search
None
See application file for complete search history.

(56) References Cited

U.S. PATENT DOCUMENTS

| | | | | |
|---|---|---|---|---|
| 8,068,016 | B2 * | 11/2011 | Toh | 340/425.5 |
| 2007/0022454 | A1 * | 1/2007 | Yoon et al. | 725/100 |
| 2007/0121521 | A1 * | 5/2007 | D'Amico et al. | 370/252 |
| 2009/0115638 | A1 * | 5/2009 | Shankwitz et al. | 340/988 |
| 2010/0182982 | A1 * | 7/2010 | Yim et al. | 370/338 |
| 2010/0194592 | A1 * | 8/2010 | Yim et al. | 340/905 |
| 2011/0090847 | A1 * | 4/2011 | Hu | 370/328 |

* cited by examiner

*Primary Examiner* — Christine Duong
(74) *Attorney, Agent, or Firm* — Dirk Brinkman; Gene Vinokur

(57) ABSTRACT

Message are broadcast in a vehicular environment using a network of nodes, wherein each node includes a transceiver and a processor arranged in a vehicle, and a bandwidth of the network is partitioned into a control channel (CCH) and multiple service channel (SCH). Time is partitioned into alternating control channel intervals (CCHI) and service channel intervals (SCHI). A source node detects an event and broadcasts a message related to the event. The message specifies current channels and next channels used by the source node to broadcast the message. The message is received in a set of relay nodes. Then, each relay node that receives the message rebroadcasts the message during the SCHI on the CCH or any other channels not specified in the message.

4 Claims, 7 Drawing Sheets

100

100

300

BROADCASTING MESSAGES IN MULTI-CHANNEL VEHICULAR NETWORKS

RELATED APPLICATION

This application is related to U.S. patent application Ser. No. 12/629,607 entitled "Signaling for Safety Message Transmission in Vehicular Communication Networks" filed by Jianlin Guo on Dec. 2, 2009, incorporated herein by reference.

FIELD OF THE INVENTION

This invention relates generally to wireless communication networks, and more particularly to broadcasting high priority messages in multi-channel vehicular networks.

BACKGROUND OF THE INVENTION

Governments and manufacturers are cooperating to improve traffic and vehicle safety using vehicular ad-hoc networks (VANETs), e.g., as specified by the IEEE 802.11p and IEEE P1609 standards. Other standards, such as continuous air-interface, long and medium range (CALM) can also be used. Vehicles in VANETS broadcast traffic and vehicle information, such as a location, velocity, acceleration, and braking status in periodic heartbeat messages, typically every 100 milliseconds.

The Federal Communications Commission (FCC) has allocated a 75 MHz bandwidth at 5.9 GHz for intelligent traffic system (ITS) applications such as VANETS. The bandwidth is allocated exclusively for vehicle-to-vehicle (V2V) communications and vehicle-to-infrastructure (V2I) communications. Dedicated short range (≈0.3 to 1 km) communications (DSRC) has been adopted as a technique for ITS services on this bandwidth.

The bandwidth is partitioned into multiple channels, e.g., seven 10 MHz channels including a control channel (CCH) and six service channels (SCH). The CCH CH178 is only used for public safety and control purposes. No private services are allowed on the CCH. The six SCH service channels are CH172, CH174, CH176, CH180, CH182, and CH184. Channels CH174, CH176, CH180, and CH182 are used for public safety and private services. Channels CH172 and CH184 are allocated as dedicated public safety channels, V2V public safety channel and intersection public safety channel, respectively. It should be noted that other channel partitioning schemes can be used.

Transmit powers limits are defined for the channels. CH178 has two transmission power limits, 33 dBm for non-emergency vehicles, and 44.8 dBm for emergency vehicles. For the middle range service channel CH174 and CH176, the transmission power limit is 33 dBm. For the short range service channel CH180 and CH182, the transmission power limit is 23 dBm. For dedicated public safety channels CH172 and CH184, the transmission power limits are 33 dBm and 40 dBm, respectively.

DSRC is standardized in a Wireless Access in Vehicular Environments (WAVE) protocol according to the IEEE 802.11p and IEEE P1609 standards. For channel coordination and channel synchronization, WAVE partitions time into 100 millisecond Sync Intervals. Each Sync Interval is further partitioned into a 50 milliseconds control channel interval (CCHI), and a 50 milliseconds service channel interval (SCHI). A 4 millisecond Guard Interval (GI) at the beginning of each channel interval accommodates variations in timing.

During the CCHI, high priority messages are broadcasted on the CCH while all transceivers monitor the CCH. The messages can be broadcasted on any channel during the SCHI. In a multi-channel wireless communication network, it is more difficult to reliably broadcast high priority messages than in a single channel network where all transceivers use a common channel all of the time.

WAVE imposes a 54 millisecond latency due to the existence of SCHI and Guard Interval. If an event is detected near the beginning of the SCHI, it takes at least 54 milliseconds to receive the corresponding message during the next CCHI. Even if the message is broadcasted immediately on current operation channel, the latency can still be at least 54 milliseconds for transceivers using different channels. A vehicle moving at 100 km/h travels 1.5 meters in 54 milliseconds, which is long enough to cause an accident. Therefore, a latency of 54 milliseconds is unacceptable.

The FCC has established three priority levels for ITS messages: safety of life, public safety, and non-priority. The lower priority messages can tolerate transmission latency, while high priority messages cannot. Based on the three priority levels, the SAE J2735 standard defines formats for a la carte message, a basic safety message, a common safety request message, an emergency vehicle alert message, and a generic transfer message.

The basic safety message contains safety-related information that is periodically broadcast. The common safety request message allows for specific vehicle safety-related information requests to be made that are required by vehicle safety applications. The emergency vehicle alert message is used for broadcasting warnings that an emergency vehicle is operating in the vicinity. The probe vehicle data message contains status information about the vehicle for different periods of time that is broadcasted to roadside equipment. The a la carte and generic transfer messages allow for flexible structural or bulk message exchange.

Of particular concern to the invention are high priority messages, such as crash-pending notification, hard brake, and control loss, which can only have a latency of up to 10 milliseconds. Other warning messages can have a latency up to 20 milliseconds, e.g., emergency vehicle approaching The messages, such as probe and general traffic information, can have a latency of more than 20 milliseconds.

The 54 milliseconds or greater latencies in the WAVE standard do not satisfy latency requirements of the SAE. Therefore, the latency in WAVE networks needs to be reduced.

SUMMARY OF THE INVENTION

The embodiments of the invention provide a method for increasing coverage and reducing latency while broadcasting high priority messages in a multi-channel wireless vehicular network.

Messages are broadcasted in a vehicular environment using a network of nodes, wherein each node includes a transceiver and a processor arranged in a vehicle, and a bandwidth of the network is partitioned into a control channel (CCH) and multiple service channel (SCH).

Time is partitioned into alternating control channel intervals (CCHI) and service channel intervals (SCHI). During SCHI, nodes operate on different channels. A source node detects an event and broadcasts a message related to the event. The message specifies channels on which source node broadcasts the message. The message is received by a set of nodes that operate on the same channels as source node.

Then, each node that receives the message determines if it is necessary to relay the message. If yes, it randomly selects channels not specified in the message and rebroadcasts the message during the SCHI on the selected channels.

DETAILED DESCRIPTION OF THE PREFERRED EMBODIMENTS

Figure 1:
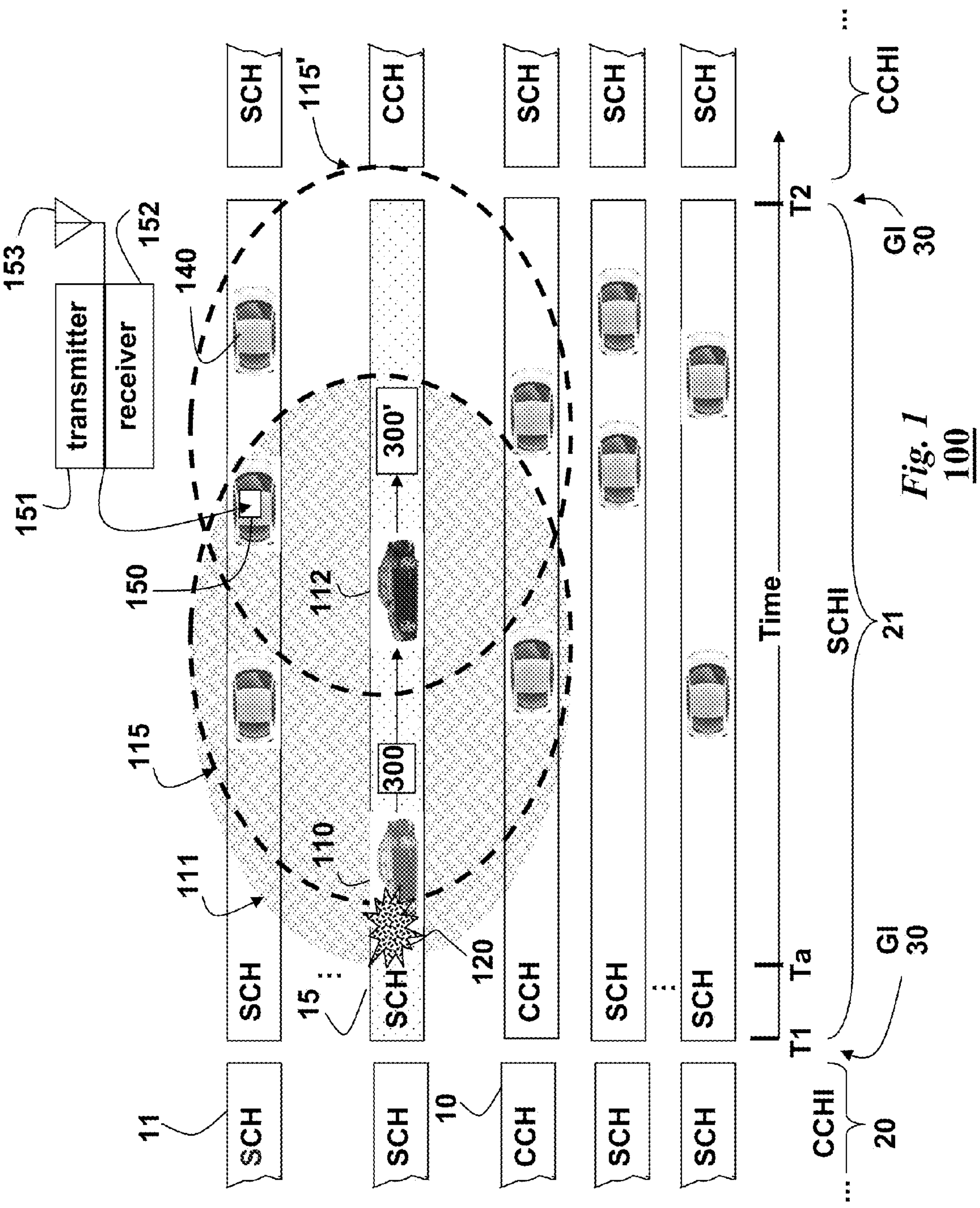
FIGS. 1-2 are schematics of a vehicular network with multiple channels to broadcast message in response to detecting events according to embodiments of the invention.
Figure 2:
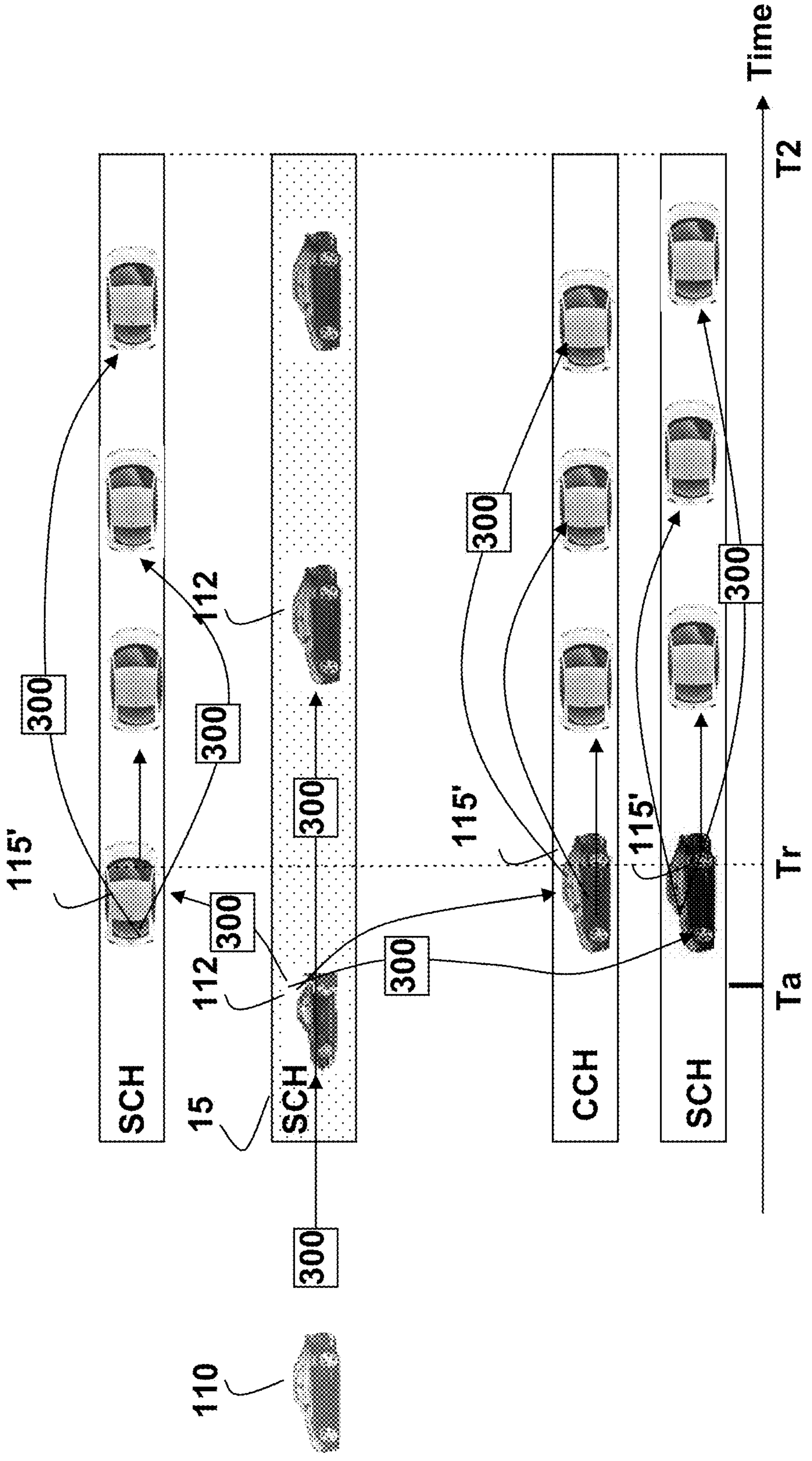

FIGS. 1-2 shows a multi-channel vehicular ad-hoc network (VANET) 100 used by embodiments of the invention. Each vehicle 140 operating in the VANET includes a transceiver 150, i.e., a transmitter 151 and a receiver 152 connected to one or more antennas 152. The transceivers operate in half-duplex mode. Hereinafter, a node refers to a combination of the vehicle and the associated transceiver.

Bandwidth in the network is partitioned into a single control channel (CCH) 10, and multiple service channels (SCH) 11. The CCH is used for high priority messages during the control channel interval (CCHI) 20, and is used for low priority messages during a service channel interval (SCHI) 21. The SCHs are used for service messages during the control channel interval (CCHI) 20, and are used for safety and service messages during a service channel interval (SCHI) 21. The CCHI and SCHI are separated by guard intervals (GI) 22. The invention is particularly concerned with communications on the SCHs and CCH during the SCHI.

In response to detecting an event 120 during the SCHI, a source node 110 broadcasts 111 a message 300 on a channel 15. The message includes information related to the event. In one embodiment, the message has a high priority, thus, latency must be minimized while rebroadcasting the message to as many vehicles as possible. For example, if the event is related to safety of life, then the priority is relatively high.

A set of relay nodes 115 can rebroadcast the message as described in greater below. The set of relays nodes, as defined herein, can include one or more nodes. It is understood that the set of relay nodes 115 are within radio range of the broadcast 111 by the source node 110. However, each relay node 112 in the set can only rebroadcast if the relay node is monitoring the same channel used by the source node for broadcasting the message.

When the relay node 112 rebroadcasts the message 300', that node becomes a source node for, perhaps, a different set of relay nodes 115' within range of the rebroadcasting node 112. In other words, the network 100 is an ad-hoc network that dynamically changes as vehicles in the traffic move, and messages are propagated.

During the SCHI 21 from time T1 to T2, WAVE allows transceivers to operate on different service channels or remain on control channel. The SCHI [T1, T2] is followed by the CCHI when all transceivers monitor a common control channel (CCH). However, because the SCHI and an intermediate guard interval can be as long as 54 milliseconds, the latency for broadcasting the messages to all nodes can be much longer than the 10 milliseconds demanded by the SAE J2735 standard if the next CCHI is used. During the SCHI, if the message is broadcast immediately on CCH or one of the service channels, then only the nodes that are monitoring the same channel receive the message. The invention solves both the latency and channel coverage problems. This invention allows nodes to broadcast high priority messages on the CCH during the SCHI. By allowing safety message broadcast on CCH during SCHI, the event 120 can be detected on a SCH or CCH.

The event 120 is detected at time Ta. In response, the high priority message 300 is broadcast on the channel 15. The message is only received by an in-range relay node 112 monitoring same channel 15. It is an object of the invention to broadcast the message 300 to as many nodes as possible in a shortest amount of time and on as many channels as possible.

Therefore, as shown in FIG. 2, the embodiments of the invention provide a message rebroadcasting scheme. Only the relay nodes 112, which are monitoring channel 15 and are within radio range of the source node 110, receive the message 300. These relay nodes rebroadcast the message on as many channels as possible at time Tr to reduce the latency while disseminating the message.

Figure 3:
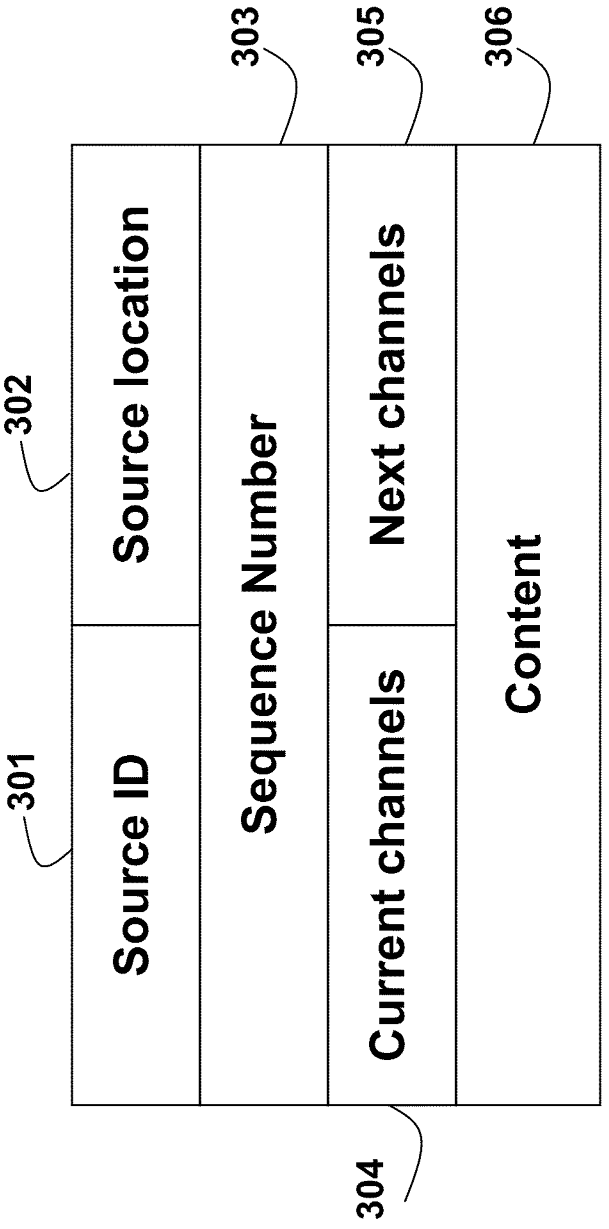
FIG. 3 is a block diagram of a message format according to embodiments of the invention.

FIG. 3 shows a format of the high priority message 300, which includes an identification (ID) 301, a location 302, a sequence number 303, current channels 304, next channels 305, and content 360 of the message. The current and next channels are SCHs or CCH.

The source ID uniquely identifies the vehicle (node) broadcasting the message. The location is used by receivers to determine the distance to the source, presuming the receivers can determine their locations. The sequence number specifies the sequence identifier for the message, and can be used to determine if a particular message was received previously. The current channels indicate the channels used by the source node to broadcast the message first. The next channels indicate the channels used by the source node to broadcast the message next. The receiver uses the current channels and the next channels to determine the channels to use during the rebroadcast.

Source node first broadcasts the message on current channels. Then, the source node immediately broadcasts the message on next channels. In this way, less relay nodes are needed to cover all channels. Therefore, channel usage is more efficient.

The current channels are the channels on that source node currently operate when the event is detected. The selection of next channels 305 can depend on various factors, such as the number of transceivers monitoring the current channels as determined, e.g., from channel load information provided in WAVE. The next channels can also be selected to have higher transmission power limits so that the message 300 can be broadcasted as far as possible. For example, the transceiver can select the next channels with transmission power limit of 33 dBm in WAVE networks. An optimization process can be used by considering all relevant factors to select next channels.

Figure 4:
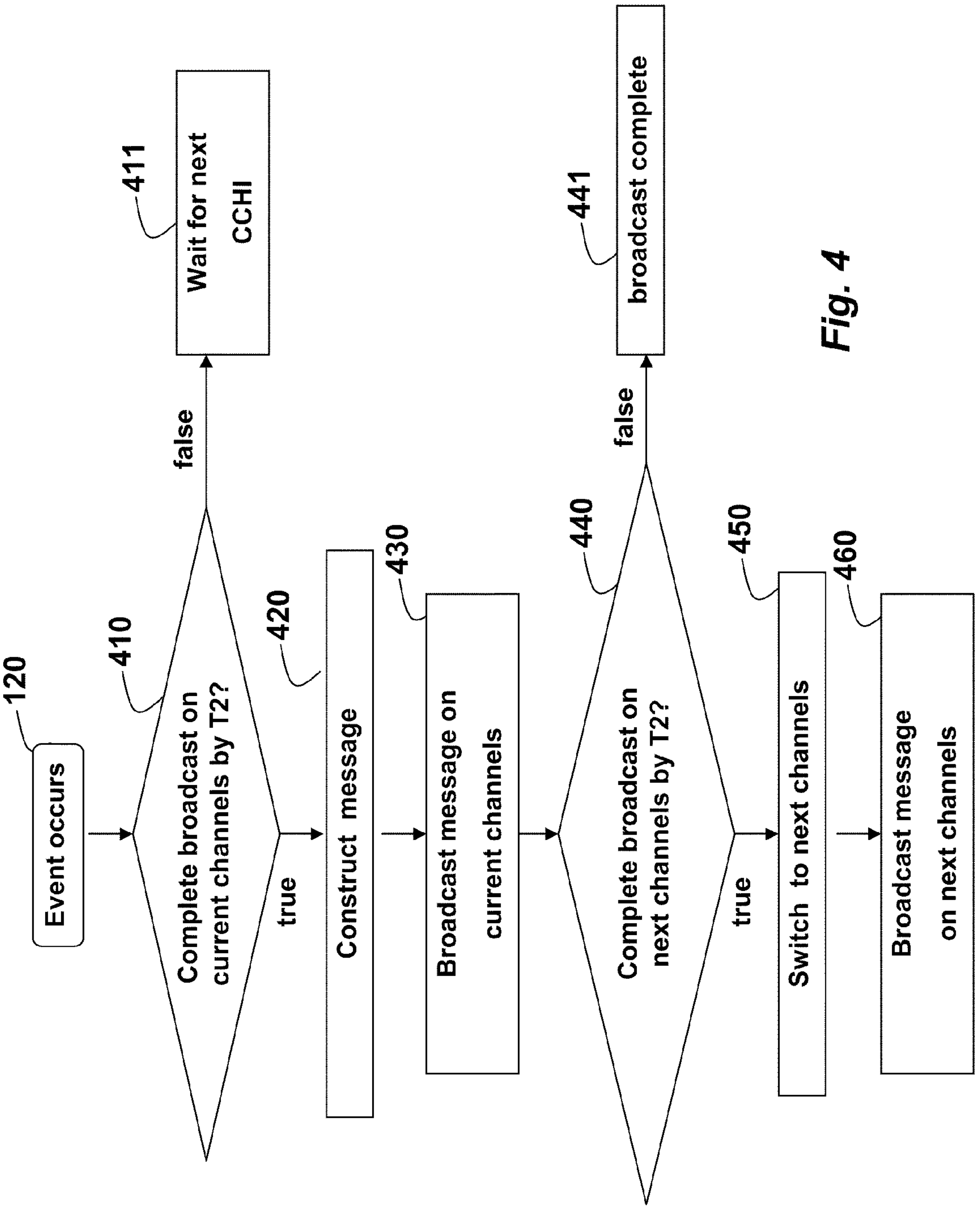
FIG. 4 is a flow diagram of a procedure used by a source to broadcast a message according to embodiments of the invention.

FIG. 4 shows a procedure for broadcasting the message 300 in response to detecting the event 120 during the time SCHI 21. The source node determines 410 if the broadcast of the message can be completed by T2. If false, the source node waits 411 for next CCHI. If true, the source constructs 420 the message 300, and broadcasts 430 the message on all current channels.

After broadcasting the message on the current channels, the source nodes determines 440 if the broadcast can be completed on the next channels by T2. If false, the source node has completed 441 broadcasting for this time interval. If true, the source node switches 450 to the next channels, if necessary, and broadcasts 460 the message on the next channels.

Figure 5:
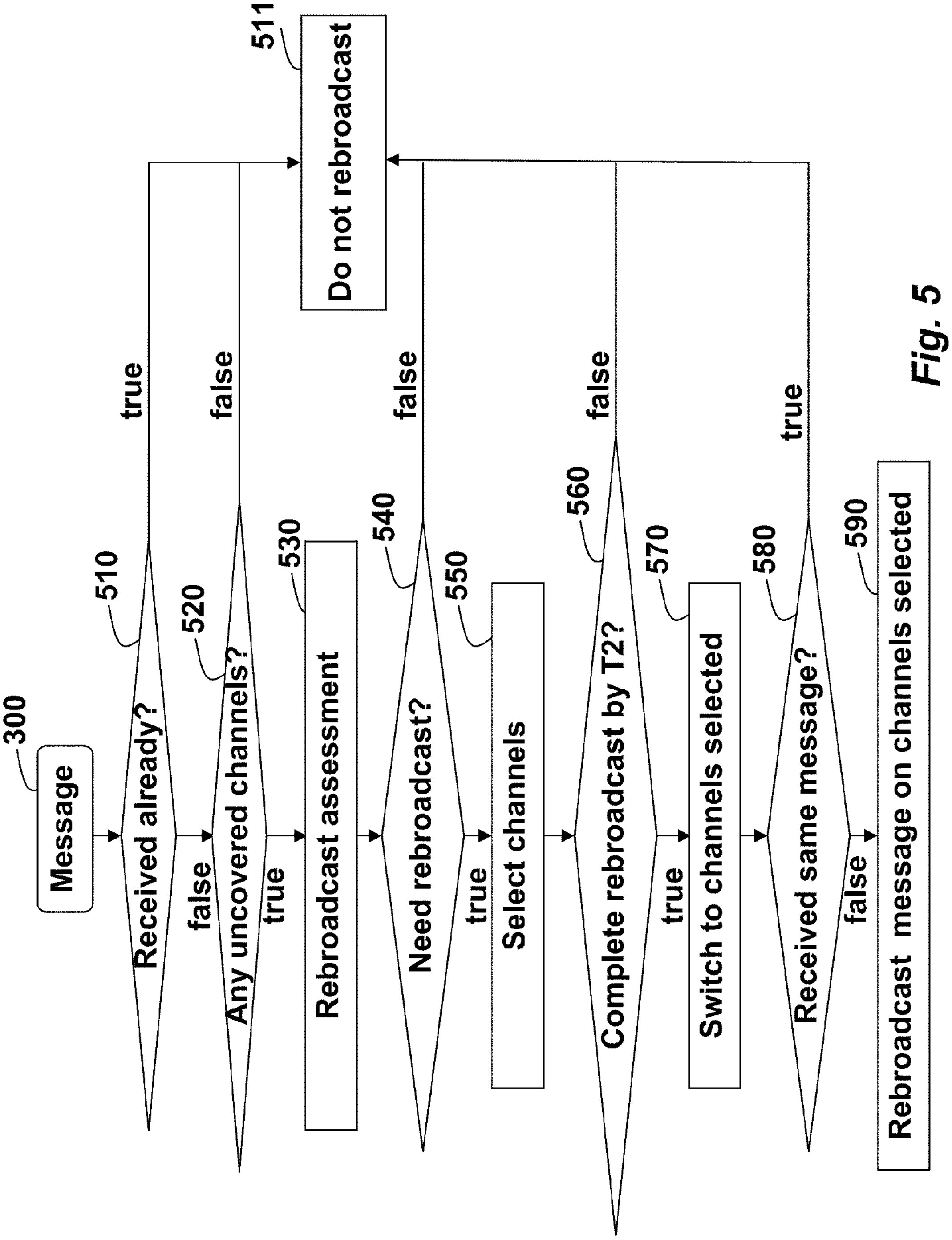
FIG. 5 is a flow diagram of a procedure for rebroadcasting message according to embodiments of the invention.

FIG. 5 shows the procedure for rebroadcasting the received message 300 during the same SCHI [T1, T2]. The receiver determines 510 if this particular message has already been received, based on the ID and sequence number. If true, the receiver does not rebroadcast 511. If false, the receiver determines 520 if there are any uncovered channels. An uncovered channel is any channel that is not specified as a current or next channel in the message. If false, the receiver does not rebroadcast 511.

If true, the receiver performs the rebroadcast assessment 530 to determine 540 if rebroadcasting is needed. If false, the receiver does not rebroadcast 511. If true, the receiver selects 550 one or more uncovered channels randomly to reduce the probability of collision and duplication. A multi-channel transceiver can first select uncovered channels that correspond to the channels currently used by the receiver so no channel switching is required.

The receiver determines 560 if the rebroadcast on the selected channels can be completed by T2. If true, the receiver switches 570 to the selected channels, if necessary. The receiver determines 580 if the message 300 is received on the selected channels. If true, the receiver does not rebroadcast 411, and if false the message is rebroadcasted 590.

The rebroadcast assessment 530 ensures that only nodes near to source node rebroadcast the message to reduce collision and duplication.

Figure 6:
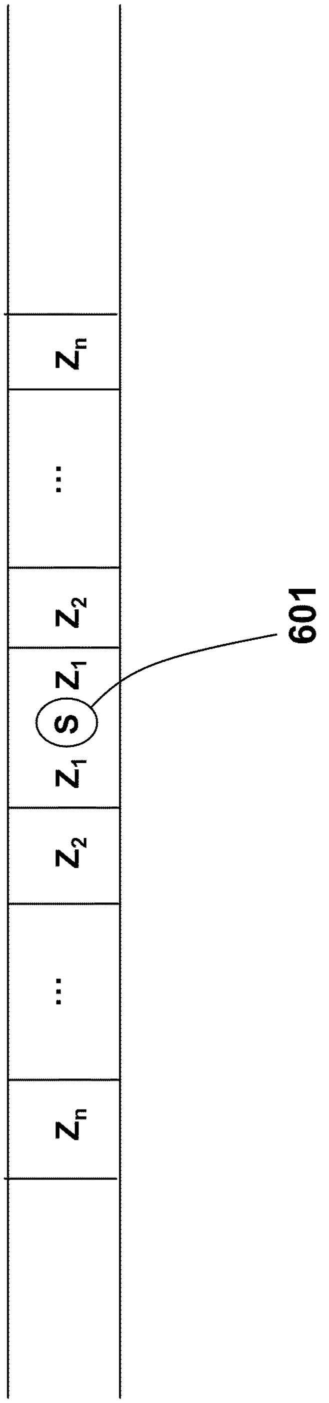
FIGS. 6-7 are schematics of partitioning a vehicular environment into zones according to embodiments of the invention.
Figure 7:
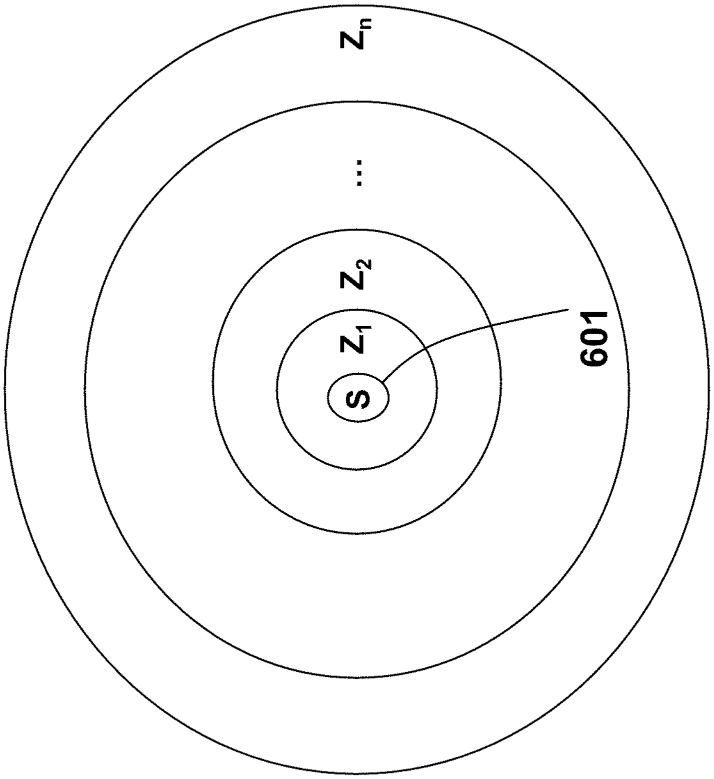

Because the safety messages, such as crash notification, are of the most interest to nearby vehicles and the transceivers nearest the source have a greater probability to decode and rebroadcast message successfully, an area around the source 601 can be partitioned into zones, Z1, Z2, . . . , Zn as shown in FIGS. 6-7. The partitioning depends on the distance to the source, the number of uncovered channels, the node density and mobility, and network topology. The size of the zones is proportional to the number of uncovered channels, and inversely proportional to the density of the transceivers near the source.

In the WAVE network, the transceiver can use the heartbeat messages to estimate the vehicle density. In a high mobility environment, the size of the zone should be larger because the messages need to be received by all adjacent transceivers. The zone should also be larger in noisy environments.

A probability function can also be defined such that transceivers in the zones close to source have greater probability to rebroadcast the message. Optimally, the message is rebroadcast on each uncovered channel by one transceiver. The sizes of the zones and probability functions control the number of relay nodes for the rebroadcasting. To enhance the reliability of message dissemination, more relay nodes can be allowed to rebroadcast. The relay nodes use the probability functions and the locations of the source during the rebroadcast assessment.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for broadcasting a message related to a vehicular environment using a network of nodes, wherein each node includes a transceiver and a processor arranged in a vehicle, wherein a bandwidth of the network is partitioned into multiple channels including a control channel (CCH) and six service channels (SCH), wherein time is partitioned into alternating control channel intervals (CCHI) and service channel intervals (SCHI), and wherein all nodes monitor the CCH channel during the CCHI and different SCH channels during the CCHI, comprising the steps of:

broadcasting by a source node, in response to detecting an emergency event in the vehicular environment during the SCHI, a high priority message related to the emergency event, wherein the high priority message specifies current channels and next channels used by the source node to broadcast the high priority message first and next;

receiving the high priority message in a set of relay nodes, wherein each relay node that receives the high priority message further performs the steps of:

identifying the high priority message uniquely;

rebroadcasting the high priority message only if the high priority message has not previously been received; and rebroadcasting the high priority message during the SCHI on the CCH or the SCH or on channels not specified by current channels and next channels such that the high priority message is rebroadcasted on the CCH and the six SCH.

2. The method of claim 1, wherein the emergency event is related to safety of life.

3. The method of claim 1, further comprising: performing rebroadcast assessment to determine if the rebroadcasting is needed.

4. The method of claim 1, wherein the channels for rebroadcasting are selected randomly.

* * * * *